United States Patent
Schlenter et al.

(10) Patent No.: US 9,967,095 B2
(45) Date of Patent: May 8, 2018

(54) SELECTIVE CONTROL OF GROUPS OF DETONATORS

(71) Applicant: DETNET SOUTH AFRICA (PTY) LTD, Woodmead (ZA)

(72) Inventors: Craig Charles Schlenter, Woodmead (ZA); Jonathan Gounden, Woodmead (ZA)

(73) Assignee: DETNET SOUTH AFRICA (PTY) LTD, Johannesburg (ZA)

( * ) Notice: Subject to any disclaimer, the term of this patent is extended or adjusted under 35 U.S.C. 154(b) by 22 days.

(21) Appl. No.: 14/916,876

(22) PCT Filed: Aug. 26, 2014

(86) PCT No.: PCT/ZA2014/000040
§ 371 (c)(1),
(2) Date: Mar. 4, 2016

(87) PCT Pub. No.: WO2015/039147
PCT Pub. Date: Mar. 19, 2015

(65) Prior Publication Data
US 2016/0218863 A1    Jul. 28, 2016

(30) Foreign Application Priority Data
Sep. 4, 2013 (ZA) ................................ 2013/06625

(51) Int. Cl.
*H04L 29/06* (2006.01)
*H04L 9/08* (2006.01)
*F42D 1/055* (2006.01)
*F42D 1/05* (2006.01)

(52) U.S. Cl.
CPC .............. *H04L 9/088* (2013.01); *F42D 1/05* (2013.01); *F42D 1/055* (2013.01); *H04L 9/0894* (2013.01); *H04L 63/0435* (2013.01)

(58) Field of Classification Search
CPC .................................................. H04L 63/0435
See application file for complete search history.

(56) References Cited

U.S. PATENT DOCUMENTS

| 6,618,237 B2 | 9/2003 | Eddy et al. |
| 7,848,078 B2 | 12/2010 | Hummel et al. |
| 8,385,042 B2 | 2/2013 | McCann et al. |

(Continued)

FOREIGN PATENT DOCUMENTS

WO    2012149584    11/2012

OTHER PUBLICATIONS

Search Report from the International Searching Authority for Application No. PCT/ZA2014/000040 dated Jan. 5, 2016 (5 pages).

(Continued)

*Primary Examiner* — Jason K Gee
(74) *Attorney, Agent, or Firm* — Michael Best & Friedrich LLP

(57) ABSTRACT

A method of communicating with a detonator assembly wherein an encryption key associated with the detonator assembly is stored in the detonator assembly and a message, intended for the detonator assembly, is encrypted at the control location using the encryption key whereupon the encrypted message is transmitted to each of a plurality of detonator assemblies and each received message is decrypted and validated.

18 Claims, 2 Drawing Sheets

(56) References Cited

U.S. PATENT DOCUMENTS

| | | | |
|---|---|---|---|
| 2005/0000382 A1* | 1/2005 | Hummel | F42C 15/42 102/200 |
| 2006/0027121 A1* | 2/2006 | Koekemoer | F42D 1/05 102/301 |
| 2010/0212527 A1* | 8/2010 | McCaan | F42D 1/02 102/215 |
| 2011/0174181 A1 | 7/2011 | Plummer et al. | |

OTHER PUBLICATIONS

Written Opinion from the International Searching Authority for Application No. PCT/ZA2014/000040 dated Jan. 5, 2016 (5 pages).

\* cited by examiner

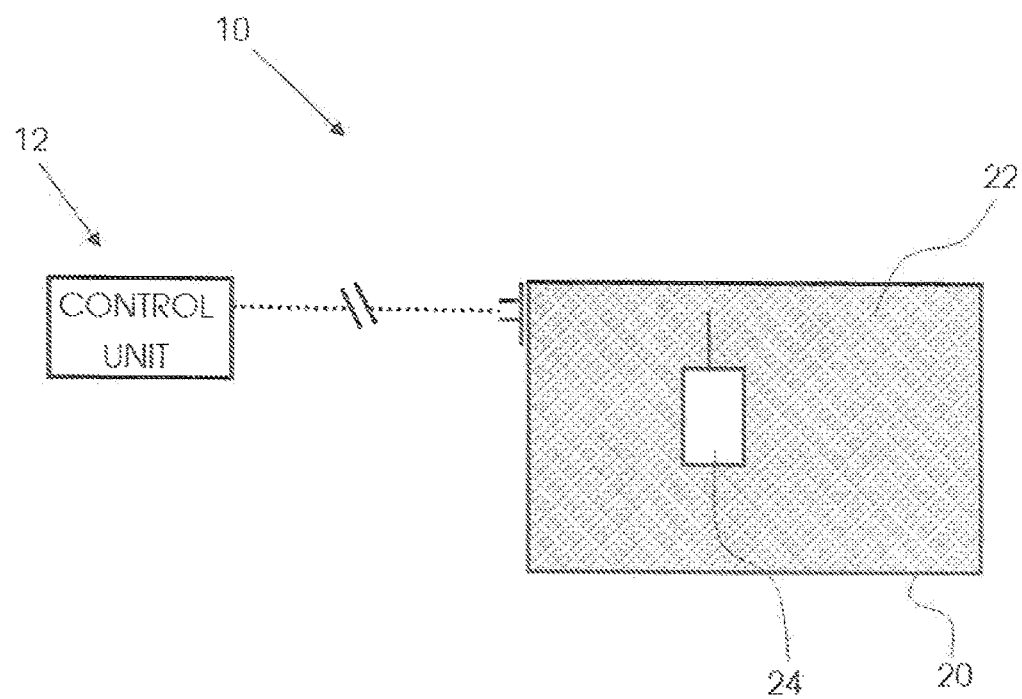
FIGURE 1
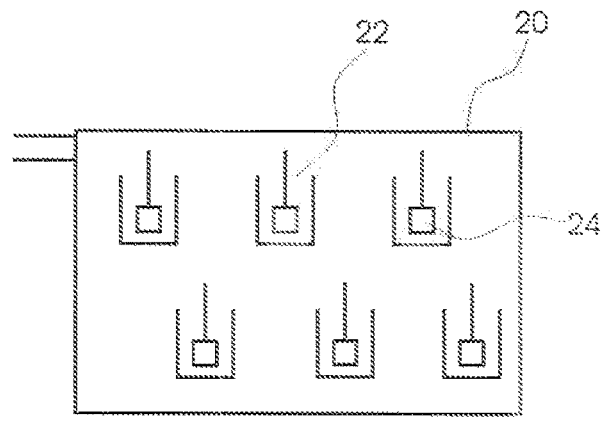

SELECTIVE CONTROL OF GROUPS OF DETONATORS

BACKGROUND OF THE INVENTION

This invention relates to the selective control of a detonator, or a group of detonators, in a blasting system which includes a plurality of the detonators.

One blasting system employs so-called "smart keys" which contain an embedded group identifier that is unique to a given matched set of keys. The key group identifier accompanies blasting messages in the system and is validated to ensure that the keys, in use in the system, have matching identifiers before allowing blasting. The system also allows a subset of blasting machines, which should participate in a blast, to be selected. This is done by means of commands directed to each blasting machine to enable the participation of that machine in subsequent blasting activities.

U.S. Pat. No. 8,385,042 discloses a method of communicating with a subgroup of wireless detonators that involves sending a group identifier in a message to the wireless detonators. Each detonator must then verify that the transmitted group identifier matches an identifier which is internally stored in the detonator. A similar technique is described in US2011/0174181 wherein a transmitter identifier code most match a receiver code in order for a detonator to be initiated.

U.S. Pat. No. 7,848,078 discloses a method of communicating with detonators in which a roll call signal includes coding to ensure that the signal is acted on only by a specific detonator assembly or by a specific group of detonator assemblies. This is done by using different frequencies for the signal.

WO2012/061850 describes a technique wherein a fire command is specifically chosen, or randomly generated, as required. This approach enables groupings of detonators to be achieved by choosing different fire commands for different groups of detonators. However, other broadcast commands are not identified as belonging to a specific group.

US2012/353203 presents a system wherein a safety data structure, communicated to a blasting machine, contains a system identifier and a device-identifier. This technique can be used to achieve selective control of groups of detonators.

In a wireless detonator system, based on the use of wireless detonator assemblies, communications are often accomplished by signals which are transmitted by modulating a magnetic field. Operating frequencies are low to ensure effective signal propagation through the earth. Consequently, data transfer rates are also low. A receiver circuit at a detonator assembly can be tuned to a specific-frequency by means of a high-Q receiver but this technique makes use of separate frequencies, to accomplish group-specific control, impractical if an additional group identifier accompanies each message then communications would be slower than is desirable.

An object of the invention is to provide a method of controlling a selected detonator assembly, or a selected group of detonators assemblies, which does not require a group identifier to be transmitted with each group-specific command, and which does not require the use of separate frequencies. This allows the communication overhead to be reduced.

SUMMARY OF THE INVENTION

The invention provides a method of communicating with at least one detonator assembly which is selected from a plurality of detonator assemblies, the method including the steps of:

1) providing a plurality of encryption keys, each encryption key being uniquely associated with a selected detonator assembly, or a selected group of detonator assemblies, in the plurality of detonator assemblies;
2) storing each encryption key in the selected detonator assembly, or in the selected group of detonator assemblies, with which the encryption key is uniquely associated;
3) storing at least one of said encryption keys at a control location;
4) at the control location encrypting a message, intended only for a selected detonator assembly, or for a selected group of detonator assemblies, using the respective encryption key which is uniquely associated with the selected detonator assembly or the selected group of detonator assemblies;
5) transmitting the encrypted message to the plurality of detonator assemblies;
6) receiving said encrypted message at each detonator assembly;
7) at each detonator assembly undertaking a decryption process on the received message using the encryption key which is uniquely associated with the detonator assembly to produce a decrypted message;
8) validating the decrypted message; and
9) if the validation process is successful, further processing the decrypted message.

Preferably the message encrypted at the control location includes a validation code which is appended to the message. The message and, optionally, the validation code are then encrypted with the encryption key in step 4.

At each detonator assembly at which the decryption process is carried out a validation code is calculated from the decrypted message and this is compared to the validation code appended to the message. If the validation codes match the message is further processed.

The encryption of messages, and transmission of encrypted messages from the control location, may be repeated to eliminate, as far as is possible, errors resulting from corrupted messages or from other sources.

The transmission of the encrypted message may be done using wireless techniques. In one form of the invention the transmission is effected by modulating a magnetic signal.

The firing of any group of detonator assemblies only requires that the encryption key for that specific group should be present at the control location. If an additional group of detonator assemblies is to be fired then the encryption key for that group would be loaded at the control location e.g. from a programming device, as desired. It is however possible to store a plurality of encryption keys at the control location. This is convenient in some respects in that it allows multiple groups of detonator assemblies to be fired in succession, without interrupting the firing process in order to load an additional encryption key for each particular group of detonator assemblies to be fired.

BRIEF DESCRIPTION OF THE DRAWING

The invention is further described by way of example with reference to the accompanying drawings in which:

FIG. 1 schematically represents a blasting system in which the method of the invention is implemented.

DESCRIPTION OF PREFERRED EMBODIMENT

Figure 2:
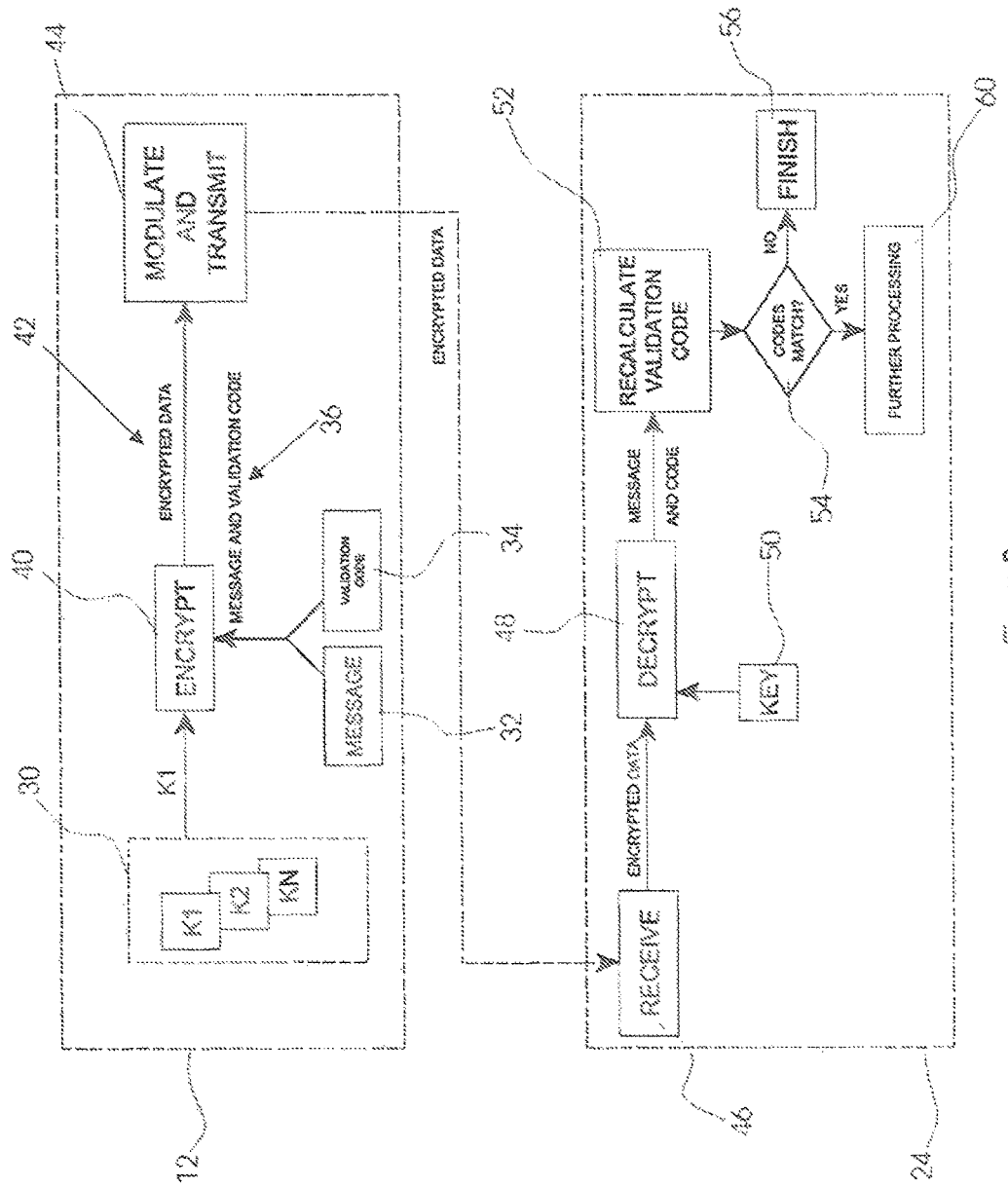
FIG. 2 depicts a number of steps which are carried out in the implementation of the method of the invention.

FIG. 1 of the accompanying drawings illustrates a blasting system 10 which includes a control unit 12, typically a blasting machine at a communication location. The blasting machine is connected directly, or by using wireless techniques, to a loop 20 which surrounds a plurality of boreholes 22 which are formed in the ground at a blasting bench. Each borehole accommodates a wireless detonator assembly 24. Communication in the system is one-way i.e. from the blasting machine to the detonator assemblies only and is effected by modulating a magnetic field which is established by energising the loop 20. This aspect is given only by way of background.

In the method of the invention communications over the wireless interface between the blasting machine and the detonator assemblies is accomplished by means of encrypted signals. An encryption key is set individually for each detonator assembly prior to selective group communication with the detonator assemblies. Each key is set in any appropriate way. For example, a portable device may be used to program an encryption key into a detonator assembly before the assembly is placed into a respective blasthole. This is a convenient and reliable way of linking the encrypted keys with the detonator assemblies. Alternatively short range wireless or other communication techniques can be used to convey a unique key, associated with a detonator assembly, into that assembly.

The same unique encryption key is loaded and stored into each detonator assembly that is required to belong to a defined group of detonator assemblies.

Different groups of detonator assemblies are associated with different respective unique keys which are distinct from the keys used for other groups of detonator assemblies. The key which is associated with a specific group of detonator assemblies to be fired, is stored and used by the blasting machine. If a plurality of groups of detonator assemblies are to be fired in succession then the respective encryption keys for these groups are preferably stored simultaneously, for use by the blasting machine.

In order to communicate with a selected group of detonator assemblies an encryption key that is stored at a control location, which may be fixed or mobile, which is uniquely associated with the detonator assemblies in that group, is used to encrypt a message. The encrypted message is then broadcast to all the detonator assemblies. The encrypted message is received at each detonator assembly and the respective encryption key, previously stored in such detonator assembly, is used to implement a decryption process. This process can only be carried out successfully if the correct key for decryption of the encrypted message is available at that detonator assembly.

FIG. 2 illustrates various steps in the implementation of the method of the invention.

A plurality of encryption keys K1 . . . to KM are held in a memory unit 30 associated with the blasting machine 12. Each encryption, key is unique and distinct from the other keys. Each encryption key is associated with a distinct detonator assembly 24, or a distinct group of the detonator assemblies, in the blasting system. As noted an encryption key is loaded into each detonator assembly in any appropriate way during the establishment of the blasting system. Thus, each key K1 . . . to KN is linked with only one detonator assembly, or links a particular set of detonator assemblies together in a defined group.

Assume that a message 32 is to be directed only to those detonator assemblies in the group which are associated with the key K1. At the control location a validation code 34 is appended to the message. The validation code, which may be a CRC, check sum, signature or hash, according to requirement, is intended to provide a means for monitoring the integrity of the message when it is transmitted and for validating that the decryption process is successful i.e. that decryption is done using the correct associated key. The resulting combination 36 of the message and validation code is encrypted in a step 40 with the key K1. This produces an encrypted message 42.

Subsequently the encrypted message 42 is transmitted to the detonator assemblies in the system. In this application the message 42 is transmitted by modulating a magnetic field which is established by the loop 20 (step 44).

Each detonator assembly 24 is able to receive each modulated and transmitted message (step 48). A decryption process 48 is then attempted using a key 50, which is associated with the detonator assembly. In this example, each detonator assembly in the target group has the stored key K1. The other detonator assemblies have different keys. At each detonator the respective stored key 50 is used in the decryption process 48. Thereafter the validation code is recalculated (52) based on the decrypted message content and compared, in a step 54, to the validation code 34 which was used at the control point and which accompanied the received message. If the comparison is unsuccessful then no further activity is undertaken at that detonator assembly in respect of the transmitted message (step 56). If the validation is successful then further processing (step 60) of the message is effected so that the instruction contained in the message can be carried out at the detonator assembly.

Due to various factors transmission errors may occur that affect the integrity of the transmitted combined validation code and message. For this reason the aforementioned process is repeated in order to reduce the likelihood of errors occurring when the blasting system is implemented. This is an important aspect given that the invention normally finds application in a system wherein the detonator assemblies in the system are not capable of transmitting return signals to the control unit.

The invention thus relies on the use of unique encryption keys each of which is associated with a defined group of detonator assemblies. Selective use is made of the encryption keys, as required, in order to encrypt messages at a control location and the encrypted messages are sent to all the detonator assemblies. Consequently a group identifier does not need to be transmitted with each group-specific command to enable the target group to respond to the command.

The use of a separate validation code is not strictly necessary. In typical systems, message integrity codes already accompany messages to ensure message integrity and these codes may be used in the context of the validation process as described herein. In this way no additional data is added to the message and no additional messaging overhead is incurred.

A modification to the aforementioned process can be effected in a situation in which the number of possible transmitted messages N, forms a small subset of the number of possible messaging encodings M. If N is significantly less than M then, with a high degree of probability, decryption with an incorrect key would not produce an apparently valid message N. In this situation, no message validation code would be required. Instead, a determination that the decrypted message is part of the set N is sufficient to validate the message and the key with a high degree of reliability.

The invention claimed is:

1. A method of communicating with at least one detonator assembly which is selected from a plurality of detonator assemblies, the method including the steps of:

1) providing a plurality of encryption keys, each encryption key being uniquely associated with a selected detonator assembly, or a selected group of detonator assemblies, in the plurality of detonator assemblies;
2) storing each encryption key in the selected detonator assembly, or in the selected group of detonator assemblies, with which the encryption key is uniquely associated;
3) storing at least one of said encryption keys at a control location;
4) at the control location encrypting a message, intended only for a selected detonator assembly, or for a selected group of detonator assemblies, using the respective encryption key which is uniquely associated with the selected detonator assembly or the selected group of detonator assemblies;
5) transmitting the encrypted message to the plurality of detonator assemblies;
6) receiving said encrypted message at each detonator assembly;
7) at each detonator assembly undertaking a decryption process on the received message using the encryption key which is uniquely associated with the detonator assembly to produce a decrypted message;
8) validating the decrypted message;
9) only if the validation process is successful, further processing the decrypted message; and
10) if the validation process is not successful, taking no further action in respect to the transmitted message.

2. A method according to claim 1 wherein the message encrypted at the control location includes a validation code which is appended to the message.

3. A method according to claim 2 wherein the message and the validation code are encrypted with the encryption key in step 4.

4. A method according to claim 3 wherein at each detonator assembly at which the decryption process is carried out a validation code is calculated from the decrypted message and this is compared to the validation code appended to the message and if the validation codes match the message is further processed.

5. A method according to claim 4 wherein steps 4 to 8, at least, are repeated to eliminate errors resulting from corrupted messages or from other sources.

6. A method according to claim 5 wherein, in step 5, the transmission is effected by modulating a magnetic signal.

7. A method according to claim 6 wherein, in step 3, a plurality of said encryption keys are stored at the control location.

8. A method according to claim 7 wherein, in step 1, a portable device is used to program the respective encryption key, which is associated with a given detonator assembly, into the detonator assembly before the assembly is placed into a respective blast hole.

9. A method according to claim 1 wherein at each detonator assembly at which the decryption process is carried out a validation code is calculated from the decrypted message and this is compared to the validation code appended to the message and if the validation codes match the message is further processed.

10. A method according to claim 9 wherein steps 4 to 8, at least, are repeated to eliminate errors resulting from corrupted messages or from other sources.

11. A method according to claim 10 wherein, in step 5, the transmission is effected by modulating a magnetic signal.

12. A method according to claim 11 wherein, in step 3, a plurality of said encryption keys are stored at the control location.

13. A method according to claim 12 wherein, in step 1, a portable device is used to program the respective encryption key, which is associated with a given detonator assembly, into the detonator assembly before the assembly is placed into a respective blast hole.

14. A method according to claim 2 wherein at each detonator assembly at which the decryption process is carried out a validation code is calculated from the decrypted message and this is compared to the validation code appended to the message and if the validation codes match the message is further processed.

15. A method according to claim 1 wherein steps 4 to 8, at least, are repeated to eliminate errors resulting from corrupted messages or from other sources.

16. A method according to claim 1 wherein, in step 5, the transmission is effected by modulating a magnetic signal.

17. A method according to claim 1 wherein, in step 3, a plurality of said encryption keys are stored at the control location.

18. A method according to claim 1 wherein, in step 1, a portable device is used to program the respective encryption key, which is associated with a given detonator assembly, into the detonator assembly before the assembly is placed into a respective blast hole.

* * * * *